United States Patent Office

3,391,198
Patented July 2, 1968

3,391,198
TREATMENT OF PHENOL PROCESS RESIDUE
George G. Joris, Madison, John Vitrone, Parsippany, and John P. Sibilia, Livingston, N.J., assignors to Allied Chemical Corporation, New York, N.Y., a corporation of New York
No Drawing. Filed Oct. 15, 1965, Ser. No. 496,684
5 Claims. (Cl. 260—619)

ABSTRACT OF THE DISCLOSURE

This invention relates to a process for the treatment of the high boiling residue obtained in the preparation of phenol by the decomposition of cumene hydroperoxide whereby para-alpha-cumylphenol and alpha-methylstyrene are recovered.

One of the most widely used processes for the preparation of phenol comprises oxidizing cumene to form a reaction mixture containing cumene hydroperoxide as one of its prime components and then decomposing the cumene hydroperoxide to form phenol, acetone, dimethylphenyl carbinol, acetophenone, alphamethylstyrene, and alpha-para-cumylphenol. The lower boiling compounds such as phenol, acetone, alpha-methylstyrene and acetophenone are separated by fractional distillation leaving a residue which has as its principal components para-alpha-cumylphenol and dimers of alpha-methylstyrene. The dimers are for the most part unsaturated compounds having the formulas:

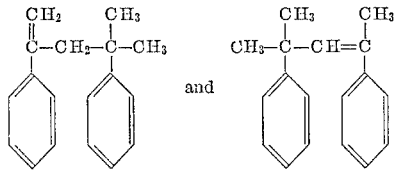

The para-alpha-cumylphenol represents a valuable product which can be employed in the preparation of polymeric composition. For instance, phenol-formaldehyde coating resins can be produced by substituting para-alpha-cumylphenol for the p-tert.-butylphenol and para-phenylphenol now employed in well-known commercial recipes. However, it is difficult to separate the para-alpha-cumylphenol from the above-mentioned residue by fractional distillation since its boiling point and that of the above-described alpha-methylstyrene dimers are very close. Further, recovery of the para-alpha-cumylphenol by alkali extraction necessitates expensive neutralization procedures, while separation by crystallization gives relatively low yields. As a consequence, the residue is now frequently burned as a fuel, a procedure which is doubly wasteful since the dimers of alpha-methylstyrene can be decomposed to form alpha-methylstyrene monomer, a valuable product used as a modifying agent for ABS plastics. It has also been proposed to treat the residue by subjecting it in liquid state to heating, generally at 200°–400° C., and preferably in the presence of an acidic catalyst, whereby both the para-alpha-cumylphenol and the dimer are decomposed to give phenol and alpha-methylstyrene. Illustrative of such proposals is U.S. Patent 2,715,145 to Bewley et al., issued Aug. 9, 1955, for "Manufacture of Phenol." However, this procedure destroys much or all of the para-alpha-cumylphenol.

It is an object of the present invention to obtain both para-alpha-cumylphenol and alpha-methylstyrene from the high boiling residue obtained in the preparation of phenol by the decomposition of cumene hydroperoxide.

The preparation of phenol by the decomposition of cumene hydroperoxide is well known and is thoroughly documented in the literature. The process is illustrated by the following typical procedure: (1) Cumene is oxidized with air or oxygen, followed by the evaporation of the bulk of the unreacted cumene. The product mixture thus obtained is primarily cumene hydroperoxide with minor amounts of acetophenone, dimethylphenyl carbinol, and other by-products, together with unreacted cumene; (2) the cumene hydroperoxide present in the product is decomposed in the presence of an appropriate catalyst. The cumene hydroperoxide decomposes into a mixture of phenol, acetone, dimethylphenyl carbinol, acetophenone, alpha-methylstyrene, and para-alpha-cumylphenol; (3) the resulting produce may be heated, suitably in the presence of an acidic catalyst, to dehydrate the dimethylphenyl carbinol to form alpha-methylstyrene; (4) alkali may be added to the product to neutralize it or the pH value of the product may be raised by treating it in an anionic exchange column thereby resinification during distillation is less extensive than in the presence of acids; (5) the product is subjected to a series of fractional distillations to remove the acetone, alpha-methylstyrene, water, phenol, and acetophenone leaving a high boiling residue having as its principal components para-alpha-cumylphenol and dimers of alpha-methylstyrene.

Decomposition catalysts such as sulfur dioxide, sulphuric acid, phosphoric acid, toluene sulfonic acid, etc., can be used in the decomposition step. The above procedure can be modified in a number of ways; for instance, the dehydration of the dimethylphenyl carbinol as a separate step can be omitted. However, as long as the high boiling residue containing substantial amounts of both alpha-methylstyrene dimers and para-alphacumylphenol are obtained, the principles of the present invention are applicable.

In accordance with the present invention, it has been discovered that by heating and thus decomposing the above-described high boiling residue in vapor phase at a high temperature for a limited period of time, the dimers of alpha-methylstyrene can be decomposed to form alpha-methylstyrene monomer, while a major percentage of the para-alpha-cumylphenol remains unchanged. A secondary product obtained is cumene, while can be handled for recycle to the oxidation, together with unoxidized cumene starting material. The temperature at which the heat treatment is carried out should be about 350°–800° C., and is preferably about 450°–600° C. The length of time during which the vapors are exposed to these high temperatures depends upon the particular temperature used and the desired degree of decomposition. At temperatures over 500° C., the rate of decomposition of alpha-methylstyrene dimers is very rapid with a major proportion being decomposed in less than a second. The length of the heat treatment does not appear to have any appreciable effect on the para-alpha-cumylphenol. Exposure of a typical residue sample to over 50° C. for 5 minutes decomposed only a very minor proportion of the para-alpha-cumylphenol. Heating of the vapors for over 5 minutes is believed to be uneconomical where a continuous process is employed.

In the preferred procedure, the residue is continuously fed through a heated column or other heating done maintained at 450°–600° C. to flash evaporate substantially all of said residue; and the resulting vapors are maintained at said temperatures for a sufficient time to decompose the dimers. As an aid in controlling the residence time in the heating zone, the vapors can be carried through the heating zone by a stream of inert gas such as nitrogen or helium. After leaving the heating zone, the vaporous products are cooled and condensed to liquid. Suitable times of treatment accomplishing the desired decomposition in vapor phase can readily be ascertained for any particular vaporizing and heating apparatus by a few experiments; and they will generally be in the range of 0.05 to 5 minutes when the preferred temperature range of 450°–600° C. is employed.

The usual temperature-time effect applies in the process of this invention, i.e., shortened times combined with increased temperatures will accomplish a given degree of reaction. While the principles on which this invention operates are not entirely clear, it is believed that one of the underlying phenomena involved is a marked difference in temperature coefficient of reaction rate between pyrolysis of cumylphenol vs. pyrolysis of alpha-methylstyrene dimers, the pyrolysis of the dimers having the larger temperature coefficient. Such difference means that as temperatures are raised the rate of dimer pyrolysis increases more rapidly than the rate of cumylphenol pyrolysis so that, at sufficiently elevated temperatures, the dimer pyrolysis predominates even though at lower temperatures the two reactions occur simultaneously, and at still lower temperatures, the cumylphenol pyrolysis would predominate. Such differences in temperature coefficient of reaction rate are attributable to different energy requirements to accomplish the subject reactions; and these energy requirements in turn are believed to be related to strength of the chemical bonds involved in the reaction and to reaction mechanism, e.g., a chain reaction displays over-all a lower energy requirement than would be associated with the strength of the chemical bonds involved in initiating the reaction. We are not aware of any method of predicting the results of these interrelationships in relatively complex situations such as that involved in this invention.

Another factor involved in our invention is the need of using vapor phase conditions, and this is believed to be a result of a high energy requirement for the desired reaction of pyrolyzing alpha-methylstyrene dimers. The pyrolysis products as first formed are probably in a state of high energy and high reactivity requiring limited exposure to high temperature followed by cooling in order to limit occurrence of side reactions such as recombination, alkylation of other products, etc. Operation in the vapor phase allows such limited exposure before cooling. Moreover, vapor phase operation reduces the opportunity for the products to collide with and react with each other, as compared to operation of such reaction at high temperatures in liquid phase. Use of an inert diluent gas as in preferred operations can further contribute to minimizing opportunity for side reactions to occur prior to cooling the products.

The following examples are given to further illustrate the invention and the best mode contemplated by us of carrying it out, but it is to be understood that the invention is not to be limited in any way by the details described therein.

EXAMPLE 1

This example was carried out with residue obtained from the preparation of phenol by the decomposition of cumene hydroperoxide and recovery of phenol, acetone, and other products by distillation, as hereinabove described. Said residue contained 38.4% by weight of para-alpha-cumylphenol, 1.7% by weight of cumene, and 59.7% by weight of alpha-methylstyrene dimers. No alpha-methylstyrene was present in the residue. A series of one-microliter samples were added to the steel injection block or box of a gas chromatograph at temperatures of 415°–535° C., whereby the samples were vaporized into the nitrogen gas atmosphere within the block. After 30 seconds, inert sweep gas (nitrogen) was flowed through the block and chromatograph column, carrying the vaporous product into the chromatograph column for analysis. The amount of para-alpha-cumylphenol remained unchanged while a portion of the dimers decomposed to form alpha-methylstyrene and some cumene. The results are summarized in the following table.

TABLE I

| Temperature, ° C. | Percent by Weight | | |
|---|---|---|---|
| | S-Methylstyrene | Dimers | Cumene |
| 415 | 6.3 | 55.1 | 1.7 |
| 470 | 14.0 | 38.5 | 4.1 |
| 515 | 19.2 | 30.7 | 7.8 |
| 535 | 23.0 | 24.5 | 9.4 |

EXAMPLE 2

This example was carried out in the same equipment used in Example 1 with phenol process residue containing 38.0% by weight of para-alpha-cumylphenol, 48.8% by weight of alphamethylstyrene dimers, 9.2% by weight of acetophenone, and 2% by weight of phenol. The procedure of Example 1 was repeated, except that the temperature was kept constant at 510° C. and the time was varied. The results are summarized in the following table:

TABLE II

| | 0.3 sec. | 40 sec. | 300 sec. |
|---|---|---|---|
| α-Methylstyrene | 14.3 | 17.0 | 21.3 |
| Dimers | 29.6 | 13.8 | 5.7 |
| Cumylphenol | 39.8 | 39.7 | 37.2 |
| Acetophenone | 8.4 | 9.9 | 9.4 |
| Phenol | 4.0 | 5.2 | 7.3 |
| Cumene | 3.8 | 4.9 | 6.5 |
| Others | | 9.5 | 1.6 |

EXAMPLE 3

Samples of the same residue used in Example 1 were pyrolyzed in a heated glass column 14″ x ¾″ filled with glass beads of about ⅛″ diameter. A nitrogen stream was fed into the top of the column and a condenser and receiving vessel were attached to the bottom of the column. The residue was dropped as a liquid into the top of the column where it immediately vaporized. The vapors were carried down through the column by the stream of nitrogen; and were then cooled and condensed, whereby there was no reflux or condensation of liquid from the vapors in the heated zone. A series of runs was made at temperatures of 400°–530° C. The para-alpha-cumylphenol was unchanged while at 450° C. and above most or all of the dimers were converted to alpha-methylstyrene and secondarily to cumene. The results are summarized in the following table:

TABLE III

| Temperature, ° C. | Feed Rate, gm./min. | Percent by Weight | | |
|---|---|---|---|---|
| | | α-Methylstyrene | Cumene | Dimers |
| 400 | 0.5 | 11 | 5 | 40 |
| 500 | 0.5 | 27 | 19 | 4 |
| 450 | 0.3 | 19 | 19 | 16 |
| 520 | 0.3 | 41 | 26 | 0 |
| 530 | 0.3 | 38 | 23 | 0 |

The cumene, alpha-methylstyrene and para-alpha-cumylphenol of the above products can readily be separated by fractional distillation.

It will be apparent that many modifications and variations may be effected without departing from the scope of the novel concepts of the present invention, and the illustrative details disclosed are not to be construed as imposing undue limitations on the invention.

We claim:

1. A process which comprises heating and thus decomposing in vapor phase a composition containing para-alpha-cumylphenol and dimers of alpha-methylstyrene at a temperature of 350–800° C. for a period of time sufficient to pyrolyze a major percentage of said dimers into alpha-methylstyrene but limiting the time of the heat treatment so that a major percentage of the para-alpha-cumylphenol is unchanged, the time of said heat treatment being a maximum of about 5 minutes.

2. A process as claimed in claim 1 wherein the composition containing para-alpha-cumylphenol and dimers of alpha-methylstyrene is prepared by decomposing cumene hydroperoxide to form a mixture of phenol and other decomposition products and then removing the phenol and other lower boiling components of the mixture to leave as a residue the desired composition containing para-alpha-cumylphenol and dimers of alpha-methylstyrene.

3. A process as claimed in claim 2, wherein said composition containing para-alpha-cumylphenol and dimers of alpha-methylstyrene is continuously fed into a heated zone maintained at 350° to 800° C. to flash evaporate said residue, and the resulting vapors are withdrawn in a stream of inert gas from said heated zone and condensed to liquid by cooling after a residence time sufficient to decompose a substantial portion of said dimers into alpha-methylstyrene but insufficient to decompose any substantial portion of the para-alpha-cumylphenol, said residence time being a maximum of about 5 minutes.

4. A process as claimed in claim 3 in which the heated zone is maintained at a temperature of 450° to 600° C. and the residence time of the vapors therein is in the range between about 0.05 minute and about 5 minutes.

5. A process which comprises heating and thus decomposing in vapor phase a composition containing para-alpha-cumylphenol and dimers of alpha-methylstyrene at a temperature of 450° to 600° C. for a period of time sufficient to pyrolyze a major percentage of said dimers into alpha-methylstyrene while limiting the heat treatment so that a major percentage of the para-alpha-cumylphenol is unchanged, the period of time of said heat treatment being in the range of about 0.05 minute to 5 minutes.

References Cited

UNITED STATES PATENTS 2,715,145  8/1955  Bewley et al. _____ 260—621

FOREIGN PATENTS 757,752  9/1956  Great Britain.

BERNARD HELFIN, *Primary Examiner.*

LEON ZITVER, *Examiner.*

H. ROBERTS, *Assistant Examiner.*